United States Patent
Elad et al.

(10) Patent No.: US 6,337,927 B1
(45) Date of Patent: Jan. 8, 2002

(54) APPROXIMATED INVARIANT METHOD FOR PATTERN DETECTION

(75) Inventors: Michael Elad, Haifa; Yacov Hel-Or, Zichron Yacov; Renato Kresch, Haifa, all of (IL)

(73) Assignee: Hewlett-Packard Company, Palo Alto ( * ) Notice: Subject to any disclaimer, the term of this patent is extended or adjusted under 35 U.S.C. 154(b) by 0 days.

(21) Appl. No.: 09/326,120

(22) Filed: Jun. 4, 1999

(51) Int. Cl.[7] ............................. G06K 9/62; G06K 9/72

(52) U.S. Cl. ........................ 382/225; 382/228; 382/160

(58) Field of Search ................................. 382/224, 225, 382/228, 159, 160, 161; 706/12, 20, 25

(56) References Cited

U.S. PATENT DOCUMENTS

| | | | | |
|---|---|---|---|---|
| 5,299,284 A | | 3/1994 | Roy ............................. | 706/20 |
| 5,634,087 A | * | 5/1997 | Mammone et al. ........... | 706/25 |
| 5,640,492 A | | 6/1997 | Cortes et al. ................. | 706/20 |
| 5,649,068 A | | 7/1997 | Boser et al. .................. | 706/12 |
| 5,671,294 A | * | 9/1997 | Rogers et al. ............... | 382/228 |
| 5,710,833 A | * | 1/1998 | Moghaddam et al. ....... | 382/228 |
| 5,926,804 A | * | 7/1999 | Tufts et al. ................... | 706/25 |
| 6,134,344 A | * | 10/2000 | Burges ........................ | 382/155 |

OTHER PUBLICATIONS

Howard et al, "A Multi–Stage Neural Network for Automatic Target Detection"; IEEE Paper ISBN: 0–7803–4859–1, vol. 1, pp. 231–236, May 1998.*

* cited by examiner

Primary Examiner—Amelia M. Au
Assistant Examiner—Mehrdad Dastouri

(57) ABSTRACT

A system and a method for classifying input vectors into one of two classes, a target class and a non-target class, utilize iterative rejection stages to first label the input vectors that belong in the non-target class in order to identify the remaining non-labeled input vectors as belonging in the target class. The system and method may be used in a number applications, such as face detection, where the members of the two classes can be represented in a vector form. The operation of the system can be divided into an off-line (training) procedure and an on-line (actual classification) procedure. During the off-line procedure, projection vectors and their corresponding threshold values that will be used during the on-line procedure are computed using a training set of sample non-targets and sample targets. Each projection vector facilitates identification of a large portion of the sample non-targets as belonging in the non-target class for a given set of sample targets and sample non-targets. During the on-line procedure, an input vector is successively projected onto each computed projection vector and compared with a pair of corresponding threshold values to determine whether the input vector is a non-target. If the input vector is not determined to be a non-target during the successive projection and thresholding, the input vector is classified as a target.

28 Claims, 8 Drawing Sheets

APPROXIMATED INVARIANT METHOD FOR PATTERN DETECTION

TECHNICAL FIELD

The invention relates generally to systems and methods for assigning input patterns into one of two classes and more particularly to a system and a method for classifying input patterns based on a linear classification.

DESCRIPTION OF THE RELATED ART

Pattern classification has drawn increasing attention in recent years, due to its application in a number of technological areas, such as acoustic signal processing and image processing. The objective in pattern classification is to separate input patterns into two classes, a target class and a non-target class. For example, for face detection in images, vectors (blocks of pixels) are extracted from an image and each vector is examined to determine whether it contains an image of a human face (target class) or not (non-target class). Another example is the detection of a specific sound, e.g., a piano sound, in an arbitrary sound signal stream. In this case, the components of the sound signal stream are classified into the specific sound class (target class) or background class (non-target class).

Various types of pattern classifiers are known in the art. Most pattern classifiers are configured to discriminate between the two classes by "learning" from two training sets, $\hat{X}=\{x_i\}_{i=1\ldots Lx}$ (target samples) and $\hat{Y}=\{y_i\}_{i=1\ldots Ly}$ (non-target samples). Such classifiers are known as example-based classifiers. The simplest and computationally fastest type of pattern classifier is a linear classifier $C(z)$, where the classifying operation is based on a mathematical projection followed by a thresholding. For a given input pattern, i.e., a vector z, the projection of z is performed onto a projection vector u and, thus, $C(z)=f(u^T z)$, where $f(*)$ is a thresholding operation or some other decision rule.

Various types of pattern classifiers are known in the art. Most pattern classifiers are configured to discriminate between the two classes by "learning" from two training sets, $\hat{X}=\{x_i\}_{i=1\ldots Lx}$ (target samples) and $\hat{Y}=\{y_i\}_{i=1\ldots Ly}$ (non-target samples). Such classifiers are known as example-based classifiers. The simplest and computationally fastest type of pattern classifier is a linear classifier $C(z)$, where the classifying operation is based on a mathematical projection followed by a thresholding. For a given input pattern, i.e., a vector z, the projection of z is performed onto a projection vector u and, thus, $C(z)=f(u^t z)$, where $f(*)$ is a thresholding operation or some other decision rule and where $U^T$ is the related transpose.

Therefore, what is needed is a system and a method for efficiently and accurately classifying input patterns into two classes, even in cases where the configuration of the two classes is complex and cannot be separated by a linear hyper-plane.

SUMMARY OF THE INVENTION

A system and a method for classifying input vectors into one of two classes, a target class and a non-target class, utilize iterative rejection stages to first label the input vectors that belong in the non-target class in order to identify the remaining non-labeled input vectors as belonging in the target class. Each iterative rejection stage involves a linear projection of an input vector that is followed by a thresholding to determine whether that input vector belongs in the non-target class. The system and method may be used in a number of applications, such as face detection, where the members of the two classes can be represented in a vector form. In a face detecting application, the system operates to determine whether an input vector, representing a block of image pixels, contains a picture of a human face.

The operation of the system can be divided into an off-line (training) procedure and an on-line (actual classification) procedure. During the off-line procedure, a training module of the system computes the projection vectors and their corresponding threshold values that will be used during the on-line procedure. During the on-line procedure, the projection vectors and the threshold values are utilized by a pattern classifier of the system to execute the iterative rejection stages to determine if an input vector should be labeled as a non-target. After all the iterative rejection stages are executed, the input vector is identified as a target, if it had not been previously labeled as a non-target.

An off-line method of computing the projection vectors and their corresponding threshold values in accordance with the invention begins when a training set of vectors, including sample targets and sample non-targets, is received by the training module of the system. Mean-variance pairs for the sample targets and the sample non-targets are then computed by the mean-variance pair calculator of the training module. Using a proximity measure approach, a first projection vector is calculated by the projection vector calculator of the training module. Preferably, the first projection vector facilitates a positive identification of a large portion of the sample non-targets. In particular, the first projection vector is chosen such that projection values of many sample non-targets fall outside a target-containing interval, i.e., an interval of projection values that contains the projection values of all the sample targets when projected onto the first projection vector.

Next, a pair of threshold values is chosen for the first projection vector by the threshold setter of the training module. The pair of threshold values defines the upper and lower limits of the target-containing interval. The threshold values are chosen to include the smallest and the largest projection values of the sample targets. The separation between the two threshold values may include the separation between the smallest and the largest projection values of the sample targets, as well as a safety margin. The safety margin may be some percentage of the separation between the smallest and the largest projection values of the sample targets, e.g., five percent, to reduce the risk of erroneous non-target classification. After the pair of threshold values has been set, the sample non-targets having projection values that fall outside of the target-containing interval defined by the two threshold values are removed from the training set. The result is a reduced training set that contains fewer sample non-targets.

Using the reduced training set, a new mean-variance pair for the remaining sample non-targets is then computed by the mean-variance pair calculator. Next, a second projection vector and its corresponding pair of threshold values are calculated by the projection vector calculator and the threshold setter, respectively, in the same manner in which the first projection vector and its corresponding pair of threshold values were derived. This process is repeated until all the sample non-targets have been removed from the training set. The end product of the off-line procedure is a number of projection vectors and their corresponding threshold values that can be utilized during an on-line procedure to classify unknown input vectors into one of the two classes.

An on-line method of classifying input vectors into one of the two classes is primarily executed by the pattern classifier of the system. The method begins at a step in which the input vectors, as well as the computed projection vectors and their corresponding threshold values, are received by the pattern classifier. For each input vector, successive rejection stages are performed by the linear projection unit and the threshold module of the pattern classifier. During each stage, an input vector is linearly projected using one of the projection vectors computed during the off-line procedure to derive a projection value. The projection value is then compared to corresponding pair of threshold values. If the projection value falls outside the target-containing interval defined by the threshold values, the input vector is labeled as a non-target. After the successive rejection stages, the input vector is identified as a target, if the input vector has not been previously labeled as a non-target. In this manner, all of the input vectors are classified as either non-targets or targets.

DETAILED DESCRIPTION

Figure 1:
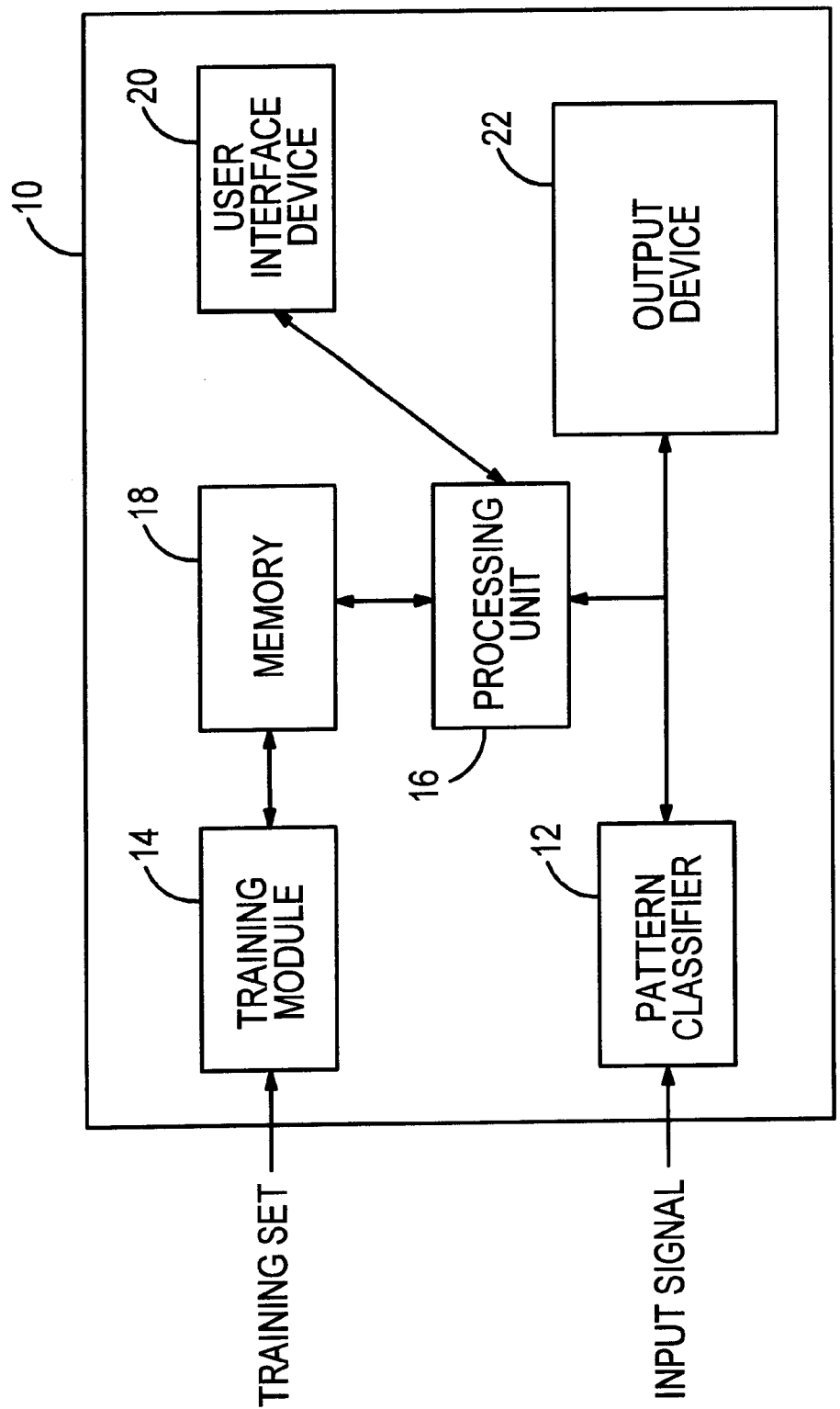
FIG. 1 is a block diagram of an approximated invariant method (AIM) system, including its components, in accordance with the present invention.

With reference to FIG. 1, an approximated invariant method (AIM) system having a pattern classifier 12, a training module 14, a processing unit 16, memory 18, a user interface device 20, and an output device 22 is shown. The AIM system operates to classify input vectors within a signal stream into one of two classes, a Target class and a non-Target ("Clutter") class. The AIM system may be used in a number of applications, such as face detection, where the members of the two classes can be represented in a vector form. In a face detecting application, the input vectors represent blocks of pixels from an image that may or may not contain a picture of a human face. In this application, the AIM system operates to discriminate between the two possibilities.

A mathematical description for the overall operation of the AIM system will be first described. The classification problem can be defined as follows: Given two classes X (Target class) and Y (Clutter class) in $_n\Re$, a point z drawn from one of these classes needs to be labeled correctly as either a Target or a Clutter. An important observation is that it is known a priori that for a typical input stream, the vast majority of the inputs are in Clutters, i.e.:

$$P\{X\} << P\{Y\}. \quad (1)$$

Based on this knowledge, the Clutter labeling should be made fast, even at the expense of a slow Target labeling, to yield a fast output, i.e., the determination of whether the input point z is a Target or a Clutter, with as few operations as possible.

Similar to other linear classifiers, the fundamental approach utilized by the AIM system 10 to label the point z as either a Target or a Clutter is to project the point z onto a projection vector u and then label the point z based on the projected value $\alpha = u^T z$. Projecting the Target class onto the projection vector u results in a Probability Density Function (PDF) $P\{\alpha|X\}$, or the "Target PDF", defined as:

$$P\{\alpha|X\} = \int_{\Re^a} e^n P\{z|X\} \delta(u^T z - \alpha) dz, \quad (2)$$

where $\delta(x)$ is the Dirac's function. The term $P\{\alpha|X\}$ defines the probability that a given input drawn from the Target class will have the value $\alpha$ after it has been projected onto the projection vector u. Similarly, projecting the Clutter class onto the projection vector u results in a PDF $P\{\alpha|Y\}$, or the "Clutter PDF", defined as:

$$P\{\alpha|Y\} = \int_{\Re^a} e^n P\{z|Y\} \delta(u^T z - \alpha) dz. \quad (3)$$

The following intervals are based on $P\{\alpha|X\}$ and $P\{\alpha|Y\}$:

$C_t = \{\alpha | P\{\alpha|X\} > 0, P\{\alpha|Y\} = 0\}$ $C_c = \{\alpha | P\{\alpha|X\} = 0, P\{\alpha|Y\} > 0\}$ $C_u = \{\alpha | P\{\alpha|X\} > 0, P\{\alpha|Y\} > 0\}, \quad (4)$ where t=Target, c=Clutter and u=Unknown. After the projection, z is labeled either as a Target, Clutter or Unknown based on the following decision rule:

$$\text{Classifier}\{z\} = \begin{cases} \text{Target} & u^T z \in C_t \\ \text{Clutter} & u^T z \in C_c \\ \text{Unknown} & u^T z \in C_u \end{cases} \quad (5)$$

Figure 2:
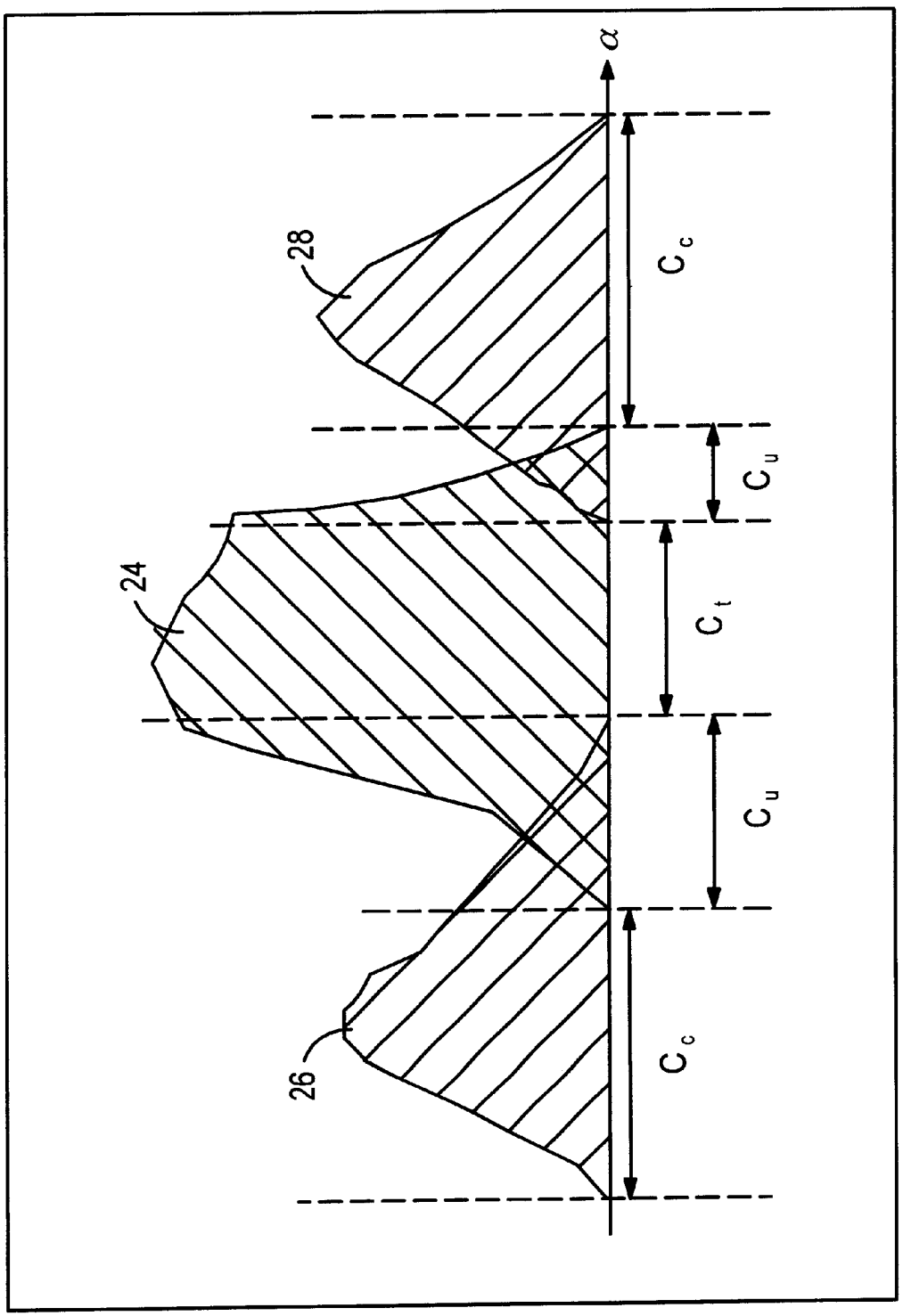
FIG. 2 is an exemplary illustration for the construction of the intervals $C_t$, $C_c$ and $C_u$ in accordance with the invention.

The Unknown classifications are obtained only in the $C_u$ interval, where a definite decision cannot be made. FIG. 2 illustrates an example for the construction of the intervals $C_t$, $C_c$ and $C_u$ and their appropriate decisions. In FIG. 2, a Target PDF 24 and two Clutter PDFs 26 and 28 are shown, super-imposed. The overlapping zones between the two types of PDFs define the Unknown regions $C_u$, in which definite decisions cannot be made.

The probability of the Unknown decision is given by:

$$P\{\text{Unknown}\} = \int_{\alpha \in C_u} [P\{Y\} P\{\alpha|Y\} + P\{X\} P\{\alpha|X\}] d\alpha. \quad (6)$$

The equation (6) is a function of the projection vector u. It is desirable to find the vector u that minimizes the Unknown probability. However, it turns out that this problem is difficult to solve directly, even for simplified cases. Thus, some heuristics need to be applied. An alternative approach is to use a proximity measure.

If $P\{\alpha|X\}$ and $P\{\alpha|Y\}$ are far apart and separated from each other, $P\{\text{Unknown}\}$ will be small. Therefore, the alternative approach is to minimize the overlap between these two types of PDFs. This approach will be defined using the following expected distance between a point $\alpha_0$ and a distribution $P\{\alpha\}$:

$$D(\alpha_0 \| P\{\alpha\}) = \int_\alpha \frac{(\alpha_0 - \alpha)^2 P\{\alpha\}}{\sigma^2} d\alpha, \qquad (7)$$

where $\tau$ is the variance of $P\{\alpha\}$ and the division by $\tau$ is performed to make the distance scale-invariant (or unit-invariant). Calculating the integral in the equation (7), it is easy to verify that:

$$D(\alpha_0 \| P\{\alpha\}) = \frac{(\alpha_0 - \mu)^2 + \sigma^2}{\sigma^2} \qquad (8)$$

where $\mu$ is the mean of $P\{\alpha\}$. Using this distance definition, the distance of $P\{\alpha|X\}$ from $P\{\alpha|Y\}$ can be defined as the expected distance of $(\alpha|Y)$ from $P\{\alpha|X\}$ and expressed as:

$$\begin{aligned} D(P\{\alpha|Y\} \| P\{\alpha|X\}) &= \int_\alpha D(\alpha \| P\{\alpha|X\}) P\{\alpha|Y\} d\alpha \\ &= \int_\alpha \frac{(\alpha - \mu^x)^2 + \sigma_x^2}{\sigma_x^2} P\{\alpha|Y\} d\alpha \\ &= \frac{(\mu_y - \mu_x)^2 + \sigma_x^2 + \sigma_y^2}{\sigma_x^2}, \end{aligned} \qquad (9)$$

where $[\mu_x, \tau_x]$ and $[\mu_y, \tau_y]$ are the mean-variance pairs of $P\{\alpha|X\}$ and $P\{\alpha|Y\}$, respectively. Since the two distributions should have as small an overlap as possible, it is desirable to maximize this distance or minimize the proximity between $P\{\alpha|X\}$ and $P\{\alpha|Y\}$, which can be defined as the inverse of their mutual distance. Note that this measure is asymmetric with respect to the two distributions. The proximity between $P\{\alpha|X\}$ and $P\{\alpha|Y\}$ defines the closeness of $P\{\alpha|Y\}$ to $P\{\alpha|X\}$, but not vice versa. Therefore, the overall proximity between the two distribution is defined as follows:

$$\begin{aligned} &Prox(P\{\alpha|Y\}, P\{\alpha|X\}) = \\ &P\{X\} \frac{\sigma_y^2}{\sigma_x^2 + \sigma_y^2 + (\mu_y - \mu_x)^2} + P\{Y\} \frac{\sigma_x^2}{\sigma_x^2 + \sigma_y^2 + (\mu_y - \mu_x)^2}. \end{aligned} \qquad (10)$$

Compared to the original expression in Equation (6), the minimization of this term with respect to $\mu$ is easier. If $P\{X\}=P\{Y\}$, i.e., if there is an even chance to get Target or Clutter inputs, the proximity becomes:

$$Prox(P\{\alpha|Y\}, P\{\alpha|X\}) = \frac{\sigma_x^2 + \sigma_y^2}{\sigma_x^2 + \sigma_y^2 + (\mu_y - \mu_x)^2}. \qquad (11)$$

This is the cost function minimized by the Fisher Linear Discriminant (FLD). Specifically, the inverse of the equation (11) is minimized by the FLD. An alternative approach would have been to use an overall distance instead, resulting with the expression $$\frac{(\mu_y - \mu_x)^2 + \sigma_x^2 + \sigma_y^2}{\sigma_x^2} + \frac{(\mu_y - \mu_x)^2 + \sigma_x^2 + \sigma_y^2}{\sigma_y^2}, \qquad (12)$$

for $P\{X\}=P\{Y\}$. However, this expression is more difficult to minimize, as compared to the FLD.

However, when $P\{X\} \ll P\{Y\}$ (Eq. 1), the first term of equation (10) is negligible and can be omitted. Therefore, the preferred u should minimize the resulting term:

$$d(u) = \frac{\sigma_x^2}{\sigma_x^2 + \sigma_y^2 + (\mu_y - \mu_x)^2}, \qquad (13)$$

where $\tau_y^2$, $\tau_x^2$, $\mu_y$ and $\mu_x$ are all function of u.

Note again that d(u) is asymmetric, and its minimization is equivalent to the maximization of equation (9). This means that most Clutter samples must be distant from the Target class, but the opposite is not necessarily required. A given Target sample can be close to some of the Clutters. This implies that most of the Clutters will be projected onto $C_c$, while $C_t$ might even be an empty set. After projection, many of the Clutter inputs are usually classified, whereas Target labeling may not be immediately possible. In fact, this serves the intended objective because for a Clutter input, there is a high probability that a decision will be made. Since Clutter inputs are more frequent, this means a faster decision for the vast majority of the inputs.

Minimization of equation (13) usually results with a small $\tau_x$ and a large $\tau_y$. This means that projection of Target inputs tends to concentrate near a constant value, whereas the Clutter inputs will spread with a large variance. Therefore, the projection onto the projection vector u stands as an approximated invariant for the Target class.

In order to find the preferred projection vector u, the $\tau_y^2$, $\tau_x^2$, $\mu_y$ and $\mu_x$ must be expressed as function of u.

$$\begin{aligned} \mu_x &= \int_\alpha \alpha P\{\alpha|X\} d\alpha = \int_\alpha \int_z \alpha P\{z|X\} \delta(u^T z - \alpha) dz d\alpha \\ &= \int_z P\{z|X\} \left[ \int_\alpha \alpha \delta(u^T z - \alpha) d\alpha \right] dz \\ &= u^T \int_z z P\{z|X\} dz = u^T M_x \end{aligned} \qquad (14)$$

and $$\begin{aligned} \sigma_x^2 &= \int_\alpha (\alpha - \mu_x)^2 P\{\alpha|X\} d\alpha = \int_\alpha (\alpha^2 - 2\alpha\mu_x + \mu_x^2) P\{\alpha|X\} d\alpha \\ &= \int_\alpha \alpha^2 P\{\alpha|X\} d\alpha - 2\mu_x \int_\alpha \alpha P\{\alpha|X\} d\alpha + \mu_x^2 \\ &= \int_\alpha \alpha^2 P\{\alpha|X\} d\alpha - u^T M_x M_x^T u \\ &= u^T \left[ \int_z z z^T P\{z|X\} dz \right] u - u^T M_x M_x^T u \\ &= u^T \left[ \int_z (z - M_x)(z - M_x)^T dz \right] u \\ &= u^T R_{xx} u \end{aligned}$$

and similarly, $$\mu_y = u^T M_y$$
$$\tau_y^2 = u^T R_{yy} u.$$

Therefore, $$\mu_x = u^T M_x \text{ and } \tau_x^2 = u^T R_{xx} u \qquad (15)$$

and $$\mu_y = u^T M_y \text{ and } \tau_y^2 = u^T R_{yy} u, \qquad (16)$$

where it is defined that $$M_x = \int_{\Re_a} e^n z P\{z|X\} dz \quad R_{xx} = \int_{\Re_a} e^n (z - M_x)(z - M_x)^T P\{z|X\} dz$$
$$M_y = \int_{\Re_a} e^n z P\{z|Y\} dz \quad R_{yy} = \int_{\Re_a} e^n (z - M_y)(z - M_y)^T P\{z|Y\} dz. \qquad (17)$$

As can be seen from the above equations (15) and (16), only the first and second moments of the classes play a role in the choice of the projection vector u. The function that is to be minimized is therefore:

$$d(u) = \frac{\sigma_x^2}{\sigma_x^2 + \sigma_y^2 + (\mu_y - M_x)^2} \quad (18)$$

$$= \frac{u^T R_{xx} u}{u^T [R_{xx} + R_{yy} + (M_y - M_x)(M_y - M_x)^T] u}.$$

The u that minimizes the equation (18) satisfies the equation $$R_{xx} u = \lambda [R_{xx} + R_{yy} + (M_y - M_x)(M_y - M_x)^T] u \quad (19)$$

and should correspond to the smallest possible $\lambda$. A problem of the form $Au = \lambda Bu$, as in equation (19), is known as the generalized eigen-value problem and can be easily solved. Notice that given any solution u for this equation, bu is also a solution with the same $\lambda$, where b is any scalar. Therefore, without loss of generality, normalized solution $\|u\|=1$ is used.

Figure 3:
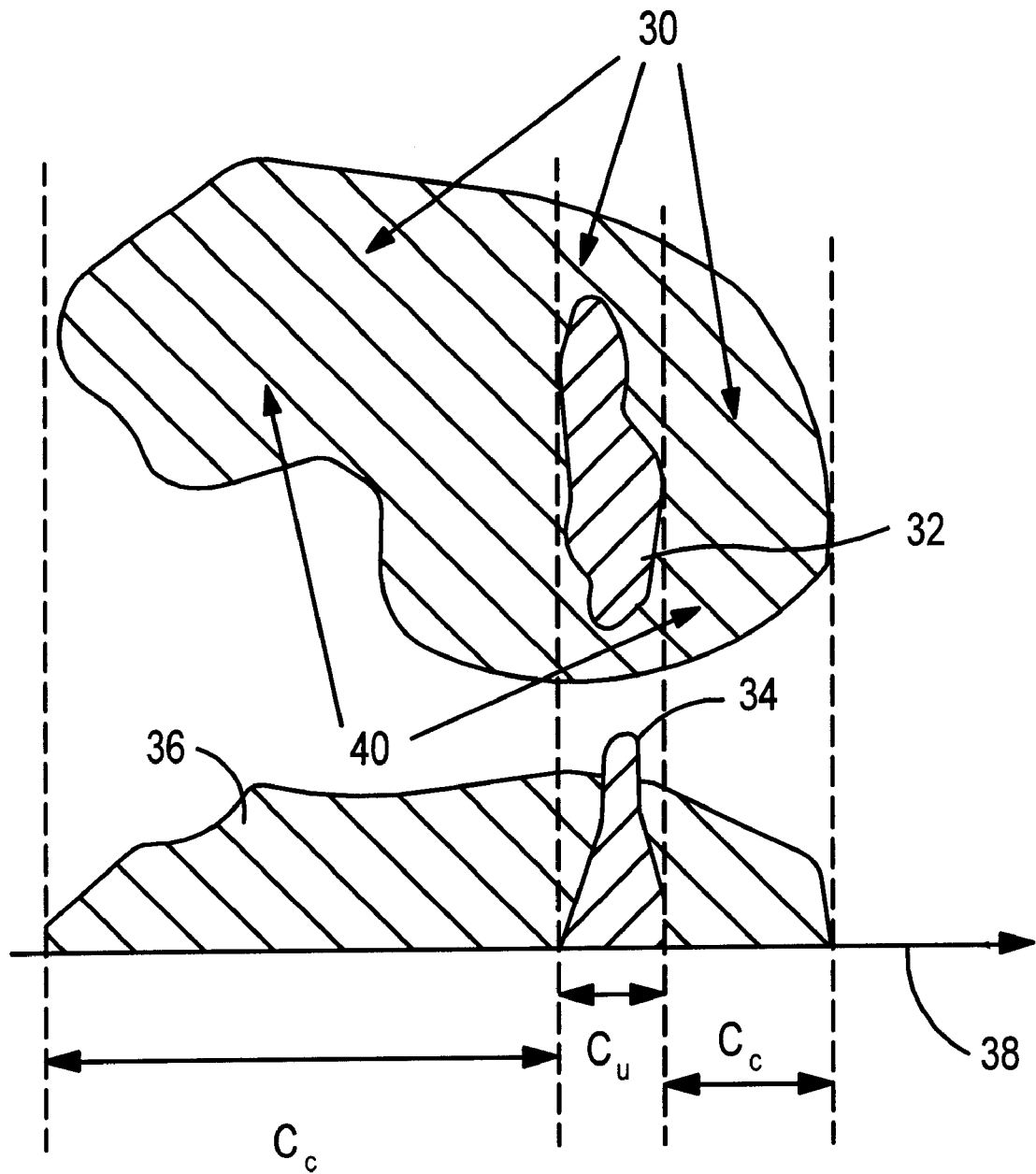
FIG. 3 illustrates the first rejection stage at which many Clutters are rejected using a first projection vector in accordance with the invention.

After finding the preferred projection vector u, the intervals $C_t$, $C_c$ and $C_u$ are determined according to equation (4). An input z is labeled as a Target or Clutter, if its projected value $u^T z$ is in the interval $C_t$ or the interval $C_c$, respectively. FIG. 3 presents this first rejection stage for the case where the interval $C_t$ is empty, i.e., there are no inputs which can be classified as a Target. In FIG. 3, the Clutters and Targets 32 are shown in two-dimensional space. For illustrative purposes, Target PDF 34 and Clutter PDF 36 for the Clutters and Targets are also shown. Note that the preferred projection vector 38 was chosen such that many of the Clutters are rejected, which are identified in FIG. 3 as rejected Clutters 40. The thresholds are chosen such that erroneous rejection of Targets is not possible for the given Targets.

Input vectors having projected values within in the interval $C_u$ are not labeled. For these inputs another step of classification is applied, where the design of the preferred projection vector in this step is performed according to the following new distributions:

$$P\{\alpha|Y \ \& \ \alpha_1 \epsilon C_u\} \text{ and } P\{\alpha|X \ \& \ \alpha_1 \epsilon C_u\}, \quad (20)$$

where $u_1$ is the first projection vector and $\alpha_1 = u^T_1 z$. The next projection vector $u_2$ is defined as the vector which minimizes the following proximity measure:

$$\text{Prox}(P\{\alpha|Y \ \& \ \alpha_1 \epsilon C_u\}, P\{\alpha|X \ \& \ \alpha_1 \epsilon C_u\}). \quad (21)$$

Figure 4:
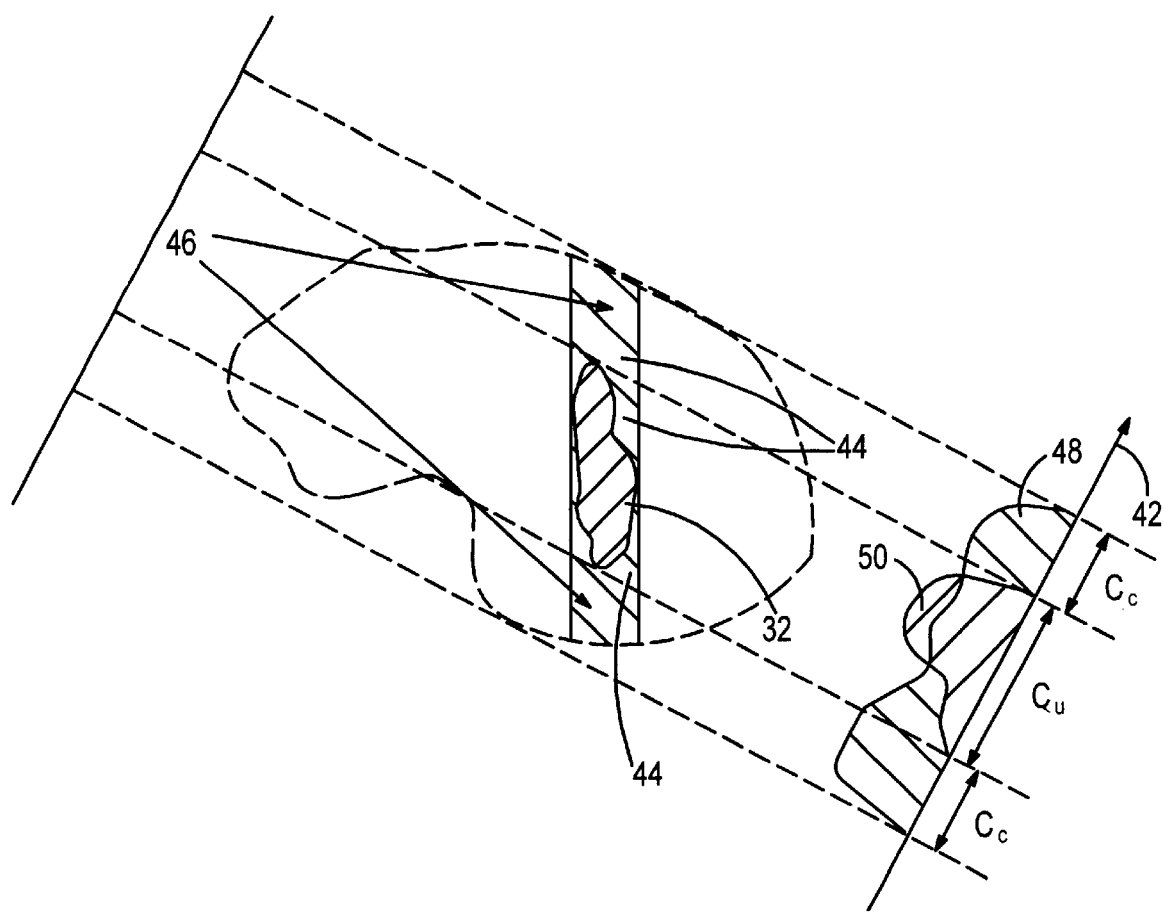
FIG. 4 illustrates the second rejection stage at which additional Clutters are rejected using a second projection vector in accordance with the invention.

This minimization is performed in the same manner as explained for the first rejection stage. FIG. 4 illustrates the second rejection stage, after the application of the first stage, shown in FIG. 3. During the second rejection stage, the next projection vector 42 is chosen such that large portions 46 of the remaining Clutters 44 are rejected. In FIG. 3, the Clutters that were rejected during the first rejection stage are shown in phantom. Again, corresponding thresholds are chosen such that erroneous rejection of Targets 32 is not possible for the given Targets. In FIG. 4, new Clutter PDF 48 and new Target PDF 50 for the remaining Clutters and Targets are also shown.

After the second rejection stage, the process can continue with projection vectors $u_3$, $u_4$, ..., etc. Due to the high rejection rate of the projection vectors for a given set of Clutters, it is expected that a large portion of the Clutter input vectors will be labeled as Clutters at each rejection stage, such that the remaining Clutter input vectors are labeled by subsequent projection vectors. Such an iterative process ensures a good performance of the classification with respect to an accurate labeling and a fast classification rate.

In practice, the probabilities $P\{\alpha|X\}$ and $P\{\alpha|Y\}$ are not known and the inference on the Target or Clutter class is achieved through examples. Two example sets are collected and denoted as $\hat{X} = \{x_k\}_{k=1}^{L_x}$ and $\hat{Y} = \{y_k\}_{k=1}^{L_y}$. It is assumed that these two collected sets are sufficiently large to be considered as good representations of the actual classes X and Y. First, an alternative definition of the function to be minimized is found, expressed in terms of the training sets. Replacing the mean-covariance pairs, $M_x$, $R_{xx}$, $M_y$, and $R_{yy}$, with empirical approximations, the mean-covariance pairs can be expressed as:

$$\hat{M}_x = \frac{1}{L_x} \sum_{k=1}^{L_x} x_k \quad (22)$$

$$\hat{R}_{xx} = \frac{1}{L_x} \sum_{k=1}^{L_x} (x_k - \hat{M}_x)(x_k - \hat{M}_x)^T$$

and $$\hat{M}_y = \frac{1}{L_y} \sum_{k=1}^{L_y} y_k \quad (23)$$

$$\hat{R}_{yy} = \frac{1}{L_y} \sum_{k=1}^{L_y} (y_k - \hat{M}_y)(y_k - \hat{M}_y)^T.$$

Substituting the empirical approximations into equation (18) results in the empirical proximity:

$$\hat{d}(u) = \frac{u^T \hat{R}_{xx} u}{u^T [\hat{R}_{xx} + \hat{R}_{yy} + (\hat{M}_y - \hat{M}_x)(\hat{M}_y - \hat{M}_x)^T] u}. \quad (24)$$

As previously described, the desired projection vector u is computed by a generalized eigen-value routine.

Since the class probabilities have been exchanged with sets of points, it is impractical to define the intervals $C_t$, $C_c$ and $C_u$ using equation (4). This is because the intervals will be composed of many fragments, each of which results from a particular example. Moreover, the domain of a cannot be covered by a finite set of examples. Thus, it is more natural to define for each set, two thresholds bounding its projection values. Due to the function that is being minimized, in most cases, the Target thresholds define a small interval located inside the Clutter interval (see FIG. 3). Therefore, for simplicity, a single interval, $\Gamma = [T_1, T_2]$, which is bounding the Target set, is defined. Using the defined interval $\Gamma$, points that are projected outside the interval $\Gamma$ are classified as Clutter and points that are projected inside the interval $\Gamma$ are classified as Unknown.

Turning back to FIG. 1, the components of the AIM system 10 operate to compute the preferred projection vectors and their corresponding pairs of threshold values, i.e., two threshold values for each computed projection vector, and then to utilize the computed vectors and the threshold values to determine whether each vector within an input signal belongs to the Target class or the Clutter class. The operation of the AIM system can be divided into an off-line (training) procedure and an on-line (actual classification) procedure. During the off-line procedure, the projection vectors and their corresponding pairs of threshold values that will be used during the on-line procedure are computed. During the on-line procedure, an input vector is projected onto each projection vector and the derived projection value is thresholded using its corresponding pair of threshold values to determine whether the input vector belongs in the Clutter class in an iterative manner. If the input vector is not labeled as belonging in the Clutter class for every projection vector, the input vector is identified as belonging in the Target class. Although the AIM system is described as utilizing only two thresholds for each computed projection vector, the AIM system may utilize more than two thresholds for each computed projection vector.

If more than two thresholds are utilized by the AIM system 10, the target and non-target classes are separated, during the training procedure, into several sub-intervals in accordance with their projection values, and training proceeds for each of these sub-intervals separately. The on-line procedure using more than two thresholds simply requires that after each projection, the projected value is compared to the existing thresholds, and further treatment will depend on the sub-interval into which the projected value fell.

Figure 5:
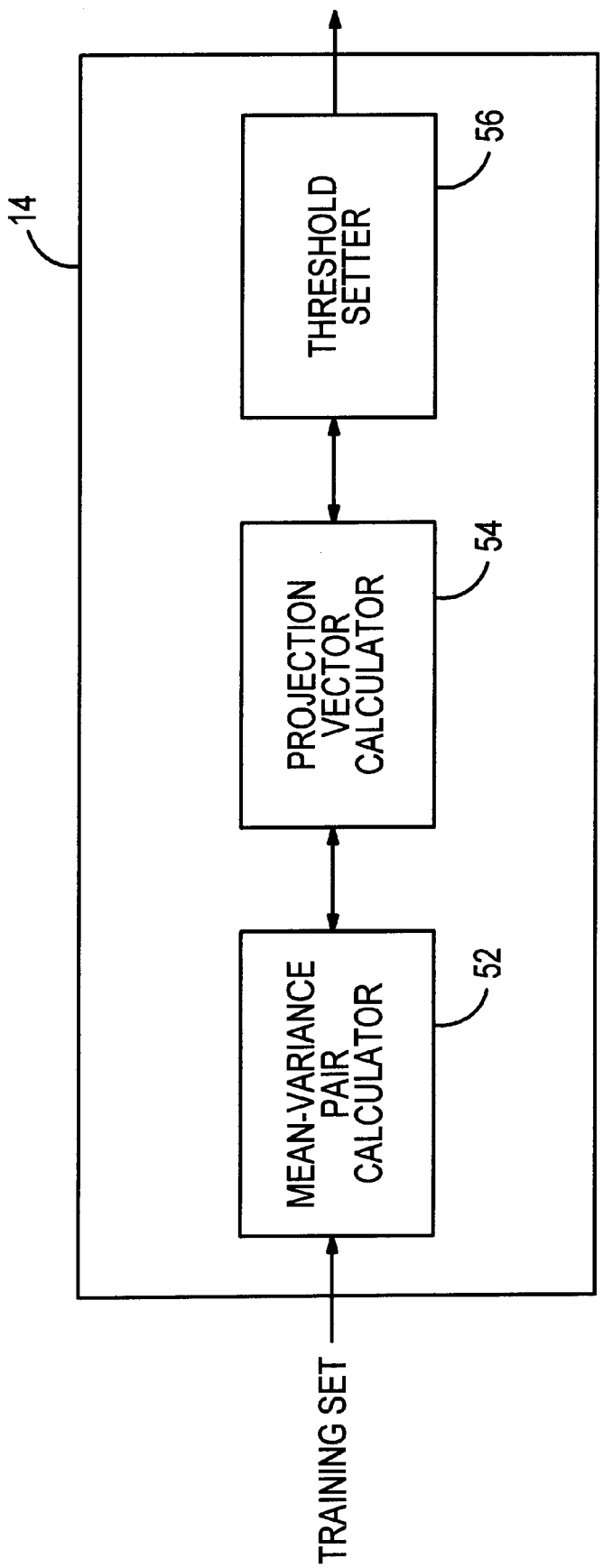
FIG. 5 is a block diagram of a training module in the AIM system of FIG. 1, including its components, in accordance with the invention.
Figure 6:
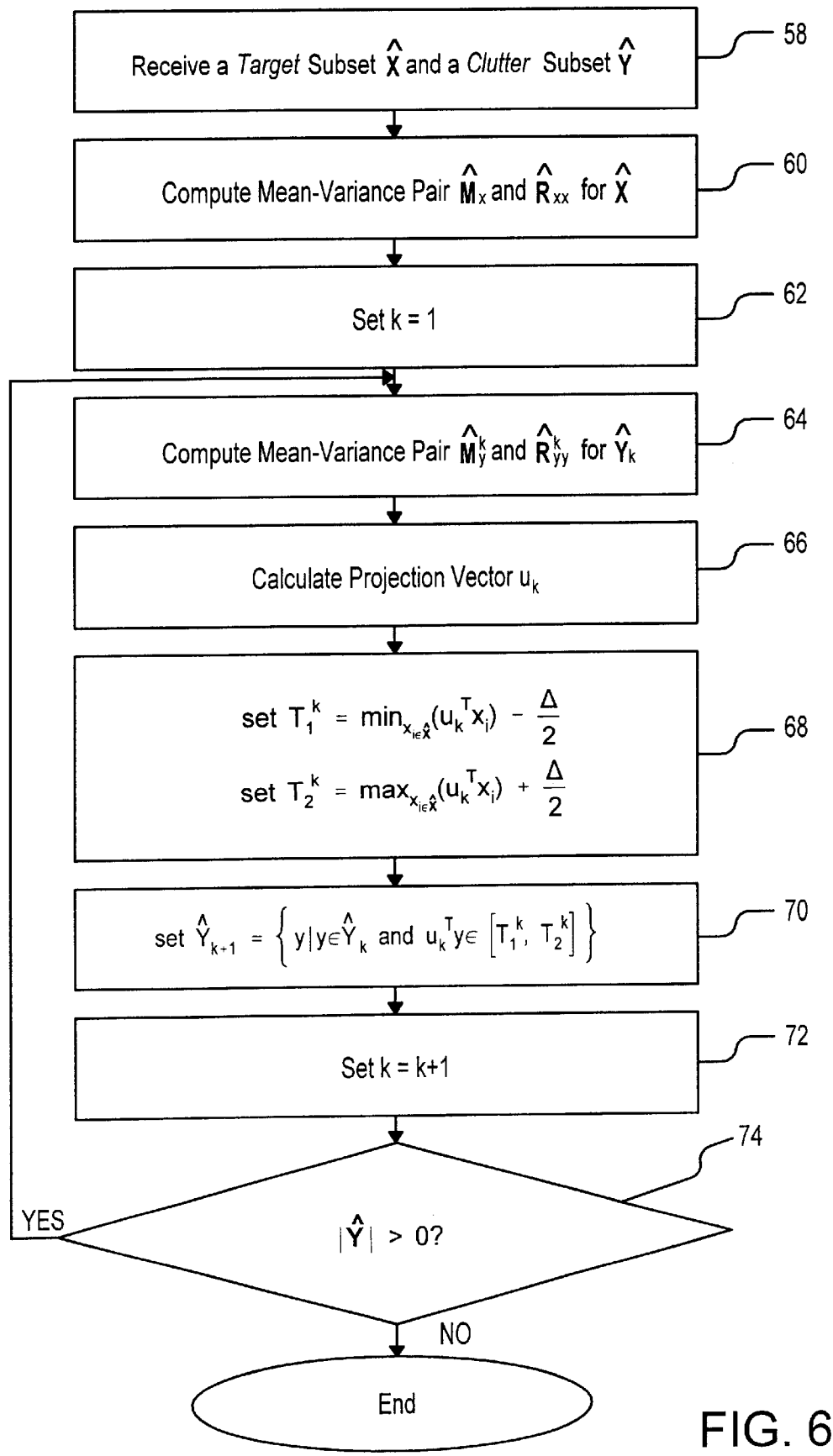
FIG. 6 is a flow diagram of an off-line method of computing projection vectors and their corresponding threshold values in accordance with the invention.

An off-line method of computing the projection vectors and their corresponding intervals in accordance with the invention is illustrated by a flow diagram, shown in FIG. 6. The off-line method is primarily executed by the training module 14 of the AIM system 10. Therefore, the off-line method will be described with reference to the components of the training module, which is shown in FIG. 5. The training module includes a mean-variance pair calculator 52, a projection vector calculator 54 and a threshold setter 56.

With reference to FIG. 6, the off-line method begins at step 58, in which a training set of vectors, including a Target sample subset $\hat{X}$ and a Clutter sample subset $\hat{Y}$, is received by the mean-variance pair calculator 52 of the training module 14. The vectors may be digitized representations of images, such as blocks of pixels, or of sounds. Using equation (22), $\hat{M}_x$ and $\hat{R}_{xx}$ for $\hat{X}$ are then computed by the mean-variance pair calculator, at step 60. Next, at step 62, the variable k is set to one. At step 64, $\hat{M}^k_y$ and $\hat{R}^k_{yy}$ for $\hat{Y}^k$ are computed by the mean-variance pair calculator, using equation (23). The projection vector $u_k$ is then calculated by the projection vector calculator 54, at step 66. The projection vector $u_k$ is the vector that minimizes the equation (24). After the calculation of the projection vector $U_k$, threshold values $T^k_1$ and $T^k_2$ that define the corresponding interval $\lceil^k$ for the current projection vector $u^k$ are determined by the threshold setter 56, at step 68. During this step, $T^k_1$ is set to $\min_{x_i \in \hat{X}}(u^T_k x_i) - \Delta/2$, while the $T^k_2$ is set to $\max_{x_i \in \hat{X}}(u^T_k x_i) + \Delta/2$. The term $\Delta/2$ in the $T^k_1$ and $T^k_2$ includes a safety margin in the interval $\lceil^k$. The $\Delta$ can be 5% of the actual interval for the Target set, i.e., $[\min_{x_i \in \hat{X}}(u^T_k x_i), \max_{x_i \in \hat{X}}(u^T_k x_i)]$, for the current projection vector $u_k$, or any other reasonable value.

After the projection vector $u_k$ and its corresponding threshold values $T^k_1$ and $T^k_2$ have been determined, the Clutter sample vectors having projection values outside the interval $\lceil^k$ are discarded, while the Clutter sample vectors having projection values within the interval $\lceil_k$ are kept for further processing. Therefore, at step 70, the Clutter set $\hat{Y}_{k+1}$ is defined as including Clutter sample values that are within the interval $\lceil^k$. Next, at step 72, the variable k is set to k+1. At step 74, a determination is made whether $|\hat{Y}_k|$ is greater than zero, where $|\hat{Y}_k|$ is the number of Clutter sample vectors remaining in $\hat{Y}_k$. If $|\hat{Y}_k|$ is greater than zero, the method proceeds back to step 64. If $|\hat{Y}_k|$ is equal to zero, the off-line method comes to an end.

In an alternative embodiment, the values $\hat{M}_x$, $\hat{R}_{xx}$, $\hat{M}_y$ and $\hat{R}_{yy}$ are modified in accordance to a regularization scheme. The modification of these values solves two potential problems that may be encountered when attempting to solve the generalized eigen-value problem, as shown in equation (19). The first problem is purely numerical. The matrix $\hat{R}_{yy}$ may become singular after several rejection stages, when few Clutters remain. The second problem involves an over-fitting problem associated with insufficient samples in the training set of Clutter samples and Target samples. An over-fitting problem results in a classifier that operates well on the example sets, but not on the actual unknown input vectors.

The regularization scheme involves taking two given example-sets, $\hat{X}=\{x_k\}_{k=1}^{L_x}$ and $Y=\{y_k\}_{k=1}^{L_x}$, and enriching these two sets in the following manner, thereby solving the over-fitting problem, as well as the numerical stability problem. For any Target point $x_k$, it is assumed that all the points z within its neighborhood are also Targets. More formally, defining the neighborhood by a sphere, it is assumed that for a predefined radius $\delta$, all z satisfying $\|z-x_k\| \leq \delta$ are Targets as well. In this fashion, the finite set $\hat{X}=\{x_k\}_{k=1}^{L_x}$ are replaced with a new richer set of points, which contains infinite number of Targets, $\hat{X}_{reg}$ (the subscript reg stands for regularization). In a similar manner, the Clutter set is also enriched, and $\hat{Y}_{reg}$ is obtained. The quality of this solution depends on the validity of the assumption that $\delta$ neighborhood contains a similar class points, and consequently, the predefined radius $\delta$ should be carefully chosen to ensure that $\delta$ is not too large. Adopting a different point of view for the above scheme, an assumption is made that when adding zero mean white Gaussian noise with moderate variance $\delta^2$ to the points $\hat{X}=\{x_k\}_{k=1}^{L_x}$, their classification does not change. Thus, if $x_k$ is a Target, so are all the realizations of $x_k+v_k$, where $v_k$ is a multi-variate Gaussian noise with zero mean and $\delta^2 I$ covariance matrix. ($V_k \sim N(0, \delta^2 I)$). Similarly, such noise can be used to enrich the Clutter set as well.

The first and second moments for the regularized sets, $\hat{X}_{reg}$ and $\hat{Y}_{reg}$, can be computed by exploiting the statistical representation of the regularization process, where the neighborhood of each given point is regarded as additive noise with a known variance. Looking at the regularized Pattern set, it can be referred to as an finite mixture of multi-dimensional (dimension n) Gaussians. These Gaussians are the following:

$$\text{Prob}\{z \mid X_{reg}\} = \frac{1}{\text{Const}} \sum_{k=1}^{k=L_x} G_{\{x_k, \delta^2 I\}}(z) \qquad (25)$$

where:

$$G_{\{M, \delta^2 I\}}(z) = \frac{1}{(2\pi\delta^2)^{n/2}} \exp\left\{-\frac{\|z - M\|^2}{2\delta^2}\right\}.$$

The constant is a normalization factor that ensures that the above probability function sums into 1. Its value is given by:

$$\text{Const} = \int_{z \in R^n} \sum_{k=1}^{L_x} \frac{1}{(2\pi\delta^2)^{n/2}} \exp\left\{\frac{-\|z - x_k\|^2}{2\delta^2}\right\} dz = L_x \qquad (26)$$

and similarly:

$$\text{Prob}\{z \mid Y_{reg}\} = \frac{1}{L_y} \sum_{k=1}^{k=L_y} G_{\{y_k, \delta^2 I\}}(z). \qquad (27)$$

The first moment (the mean) of the regularized Pattern set is given by:

$$\hat{M}_x^{reg} = E\{z \mid X_{reg}\} \quad (28)$$

$$= \int_{z \in R^n} z \cdot \text{Prob}\{z \mid X_{reg}\} dz$$

$$= \int_{z \in R^n} z \cdot \left\{ \frac{1}{L_x} \sum_{k=1}^{L_x} \frac{1}{(2\pi\delta^2)^{n/2}} \exp\left\{ \frac{-\|z - x_k\|^2}{2\delta^2} \right\} \right\} dz$$

$$= \frac{1}{L_x} \sum_{k=1}^{L_x} x_k$$

$$= \frac{1}{L_x} \sum_{k=1}^{L_x} x_k$$

$$= \hat{M}_x$$

where $\hat{M}_x$ is the first moment of $\hat{X}$, the original set before regularization. Similarly for the regularized Non-Pattern set, $\hat{M}_y^{reg} = \hat{M}_y$.

The second moment for the regularized Pattern set is computed through:

$$\hat{R}_{xx}^{reg} = E\{[z - \hat{M}_x^{reg}][z - \hat{M}_x^{reg}]^T \mid X_{reg}\} \quad (29)$$

$$= \int_{z \in R^n} [z - \hat{M}_x^{reg}][z - \hat{M}_x^{reg}]^T \cdot \text{Prob}\{z \mid X_{reg}\} dz$$

$$= \frac{1}{L_x} \sum_{k=1}^{L_x} \int_{z \in R^n} [z - \hat{M}_x^{reg}][z - \hat{M}_x^{reg}]^T \frac{1}{(2\pi\delta^2)^{n/2}} \exp\left\{ \frac{-\|z - x_k\|^2}{2\delta^2} \right\} dz$$

$$= \frac{1}{L_x} \sum_{k=1}^{L_x} [\delta^2 I + x_k x_k^T - x_k (\hat{M}_x^{reg})^T - \hat{M}_x^{reg} x_k^T + \hat{M}_x^{reg} (\hat{M}_x^{reg})^T]$$

$$= \delta^2 I + \frac{1}{L_x} \sum_{k=1}^{L_x} [x_k - \hat{M}_x^{reg}][x_k - \hat{M}_x^{reg}]^T$$

$$= \delta^2 I + \hat{R}_{xx}$$

and therefore, $\hat{R}_{xx}^{reg} = \delta^2 I + \hat{R}_{xx}$. Similarly, the Non-Pattern second moment is give by $\hat{R}_{yy}^{reg} = \delta^2 I + \hat{R}_{yy}$.

Thus, the following regularized first and second moments are derived.

$$\hat{M}_y^{reg} = \hat{M}_y \quad \hat{R}_{xx}^{reg} = \delta^2 I + \hat{R}_{xx}$$

$$\hat{M}_y^{reg} = \hat{M}_y \quad \hat{R}_{yy}^{reg} = \delta^2 I + \hat{R}_{yy} \quad (30)$$

where $\hat{M}_x$, $\hat{R}_{xx}$, $\hat{M}_y$, and $\hat{R}_{yy}$ are the mean-covariance pairs of the original sets before modification. Note that the means do not change, but the covariance matrices become well-posed because of the addition of the identity matrix that is multiplied by $\delta^2$. Also note that the two sets need not be treated similarly with regularization. In cases where the Target set contains enough examples, only the Clutter set can be regularized. In such cases, the parameter $\delta$ can be determined, for example, by finding the nearest neighbor Of $Y_k$ in the Target set, for each $y_k$, and choosing $\delta$ to be half of the smallest distance found for all $k \in [1, L_y]$.

Figure 7:
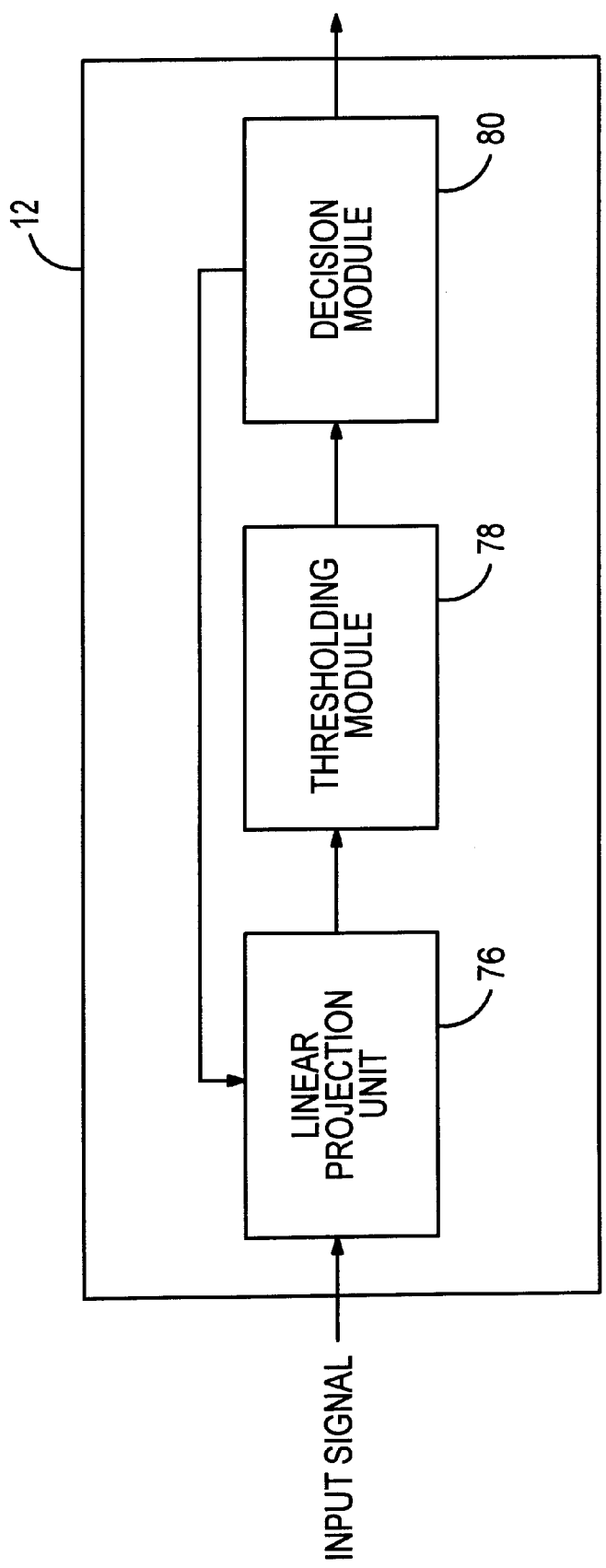
FIG. 7 is a block diagram of a pattern classifier in the AIM system of FIG. 1, including its components, in accordance with the invention.

The extracted projection vectors and their corresponding threshold values are stored in the memory 18 of the system 10, until needed for the on-line procedure. An on-line method of classifying input vectors into one of the two classes in accordance with the invention is illustrated by a flow diagram, shown in FIG. 8. The on-line method is primarily executed by the pattern classifier 12 of the AIM system 10. Therefore, the on-line method will be described with reference to the components of the pattern classifier, which is shown in FIG. 7. The pattern classifier includes a linear projection unit 76, a thresholding module 78, and a decision module 80.

Figure 8:
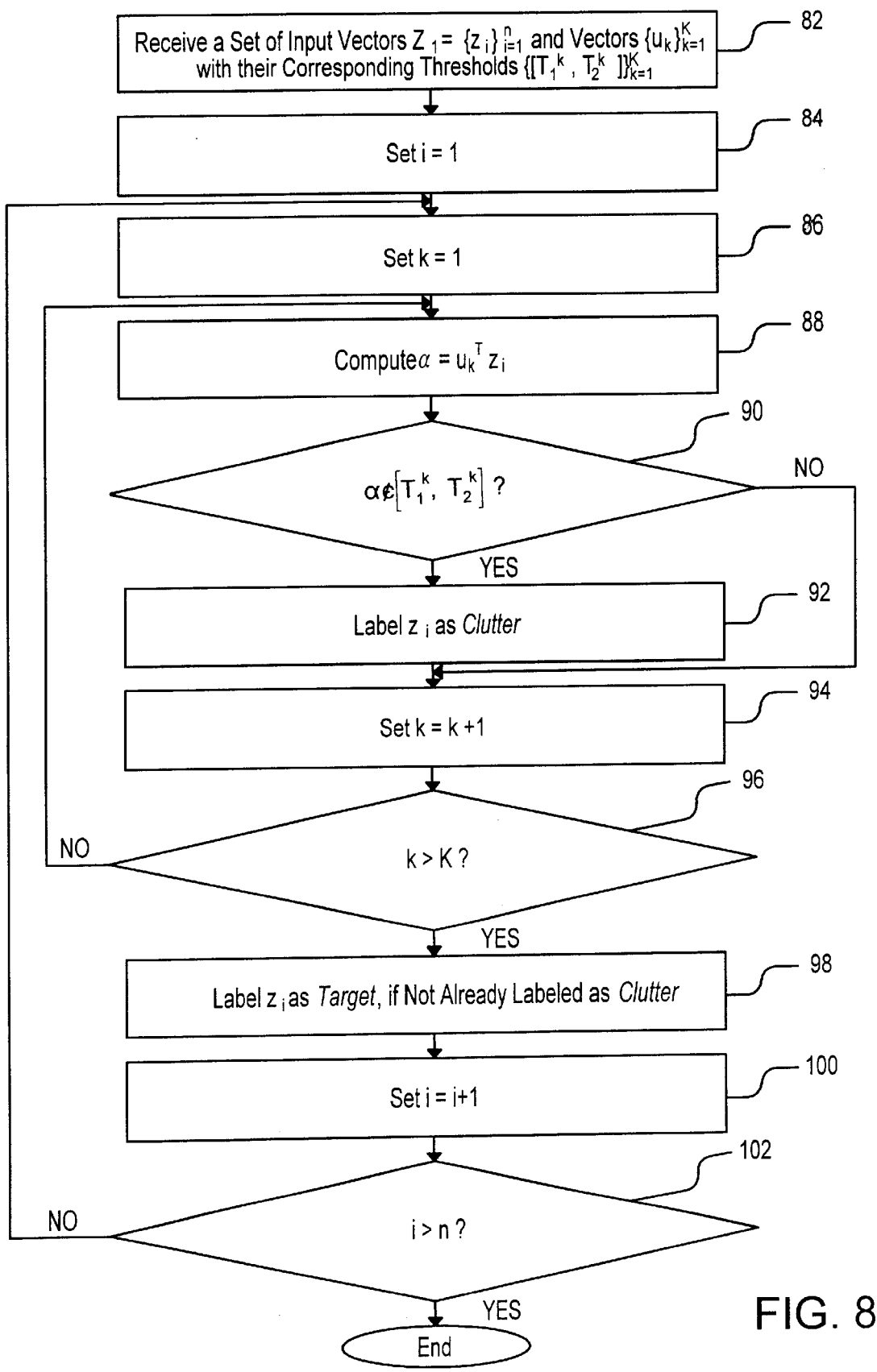
FIG. 8 is a flow diagram of an on-line method of classifying input vectors into one of two classes, a Target class and a Clutter class, in accordance with the invention.

With reference to FIG. 8, the on-line method begins at step 82, in which a set of input vectors $Z_1 = \{z_i\}_{i=1}^n$ are received by the linear projection unit 76 of the pattern classifier 12. The integer n represents the number of input vectors included in the set. In addition, the stored projection vectors $\{u_k\}_{k=1}^K$ and their corresponding thresholds $\{[T_1^k, T_2^k]\}_{k=1}^K$ are transmitted to the pattern classifier from the memory 18 by the processing unit 16 of the AIM system 10. The integer K represents the number of projection vectors that will be utilized to determine the classification of the input vectors. Again, depending on the application, each input vector can be a digitized, representation of images, such as blocks of pixels, or of sounds. At steps 84 and 86, the variables i and k are set to one. Next, at step 88, a projected value $\alpha$ is computed by the projection vector calculator 54, using the equation $\alpha = u_k^T z_i$. At step 90, a determination is made whether the projected value $\alpha$ is outside the interval $\lceil^k$ defined by the threshold values $T_1^k$ and $T_2^k$ that correspond to the projection vector $u_k$. This determination is executed by the thresholding module 78. If step 90 is satisfied, the method proceeds to step 92, where the input vector $z_i$ is labeled as Clutter. However, if step 90 is not satisfied and the projected value $\alpha$ is within the interval $\lceil^k$, the method proceeds to step 94. At step 94, the variable k is set to k+1.

After the input vector $z_i$ has been analyzed using the projection vector $u_k$ and its associated threshold values $T_1^k$ and $T_2^k$, a determination is made whether the variable k is greater than K, at step 96. If step 96 is not satisfied, the method proceeds back to step 88, in order to further analyze the input vector $z_i$. If step 96 is satisfied, the method proceeds to step 98. During this step, the input vector $z_i$ is labeled as Target by the decision module 80, if it has not been already labeled as Clutter at step 92. Next, at step 100, the variable i is set to i+1, so that the next input vector can be processed. At step 102, a determination is made whether i is greater than n. If step 102 is not satisfied, the method proceeds back to step 86, in order to process the next input vector. However, if step 102 is satisfied, the on-line method comes to an end. The result of the on-line method is that each input vector has been labeled as either a Target or Clutter.

The final determination of the input vectors may be displayed on the output device 22 of the AIM system in a desired format, depending on the parameter prescribed by an operator via the user interface device 20. As an example, in a face detecting application, the output displayed on the output device may be an image with highlighted blocks of pixels that correspond to the input vectors that have been labeled as Targets.

What is claimed is:

1. A method of classifying an input pattern into one of two classes, a low probability target class and a high probability non-target class, comprising steps of:

receiving a training set of target patterns and non-target patterns, said target patterns being members of said low probability target class, said non-target patterns being members of said high probability non-target class;

executing a training stage using said training set of said target patterns and said non-target patterns, including deriving a plurality of advantageous projection vectors from said training set, each of said projection vectors having a characteristic to yield a close-to-maximal rejection rate of said non-target class for a given set of said target patterns and said non-target patterns;

applying a rejection-based sequence of said advantageous projection vectors on said input pattern for classification in said high probability non-target class, including progressing said input pattern through each stage of said rejection-based sequence unless said input pattern is classified at one of said stages as being in said high probability non-target class; and classifying said input pattern as being in said low probability target class if said input pattern progresses through each said stage.

2. The method of claim 1 wherein said step of deriving said plurality of said advantageous projection vectors includes utilizing a proximity measure based on probability distributions of said target patterns and said non-target patterns.

3. The method of claim 2 wherein said step of utilizing said proximity measure includes a step of minimizing said proximity measure, said proximity measure being an inverse of a mutual distance of said probability distributions.

4. The method of claim 3 wherein said step of minimizing said proximity measure for a particular advantageous projection value (u) and the associated transpose ($u^T$) includes a step of minimizing an expression $$\frac{u^T R_{xx} u}{u^T [R_{xx} + R_{yy} + (M_y - M_x)(M_y - M_x)^T] u},$$

where $M_x$ and $R_{xx}$ are a mean-variance pair of said probability distribution of said target patterns and where $M_y$ and $R_{yy}$ are a mean-variance pair of said probability distribution of said non-target patterns.

5. The method of claim 4 further comprising a step of regularizing said mean-variance pairs, $M_x$, $R_{xx}$, $M_y$ and $R_{yy}$.

6. The method of claim 5 wherein said step of regularizing said mean-variance pairs includes regarding a neighborhood of each pattern of said target patterns and said non-target patterns, which is defined by a preselected parameter, as additive noise with a known variance.

7. The method of claim 1 wherein said step of executing said training stage includes a step of selecting pairs of threshold values for said advantageous projection vectors, each pair of said threshold values being associated with a particular advantageous projection vector, each pair of said threshold values defining an upper limit and a lower limit of a corresponding target-containing interval.

8. The method of claim 7 wherein said step of applying said rejection-based sequence of said advantageous projection vectors includes steps of:

iteratively projecting said input pattern using said advantageous projection vectors, which results in a sequence of projection values; and thresholding each of said projection values with a selected pair of said threshold values for said classification.

9. The method of claim 1 wherein said step of executing said training stage further includes a step of removing said non-target patterns from an input set of said non-target patterns that has a projection value that falls outside a target-containing interval for a particular advantageous projection vector, thereby defining a reduced set of said non-target patterns, said target-containing interval including projection values of said target pattern for said particular advantageous projection vector, said reduced set being said input set for a subsequent advantageous projection vector, said step of removing said non-target patterns being performed for each of said advantageous projection vectors.

10. The method of claim 1 wherein said step of executing said training stage includes a step of selecting groups of threshold values for said advantageous projection vectors, each group of said threshold values containing n values being associated with a particular advantageous projection vector, each said group of said threshold values defining a group of (n−1) sub-intervals.

11. The method of claim 10 wherein said step of applying said rejection-based sequence of said advantageous projection vectors includes steps of:

iteratively projecting said input pattern using said advantageous projection vector, which results in a sequence of projection values; and thresholding each of said projection values with a selected group of said threshold values for said classification.

12. The method of claim 10 wherein said step of executing said training stage further includes a step of removing said target and non-target patterns from the training sets for each sub-interval from said group of said (n−1) sub-intervals such that said target and non-target examples that fall outside said each sub-interval are removed, thereby defining a reduced set of said target and non-target patterns, said reduced sets being said input set for a subsequent advantageous projection vector.

13. The method of claim 1 wherein said step of receiving said training set of target patterns and non-target patterns is a step of receiving said training set of target vectors and non-target vectors, each of said target vectors representing a block of image pixels that contains a picture of a human face, each of said non-target vectors representing a block of image pixels that does not contain said picture of said human face.

14. A system for classifying an input pattern into one of two predetermined classes, a low probability target class and a high probability non-target class, comprising:

training means for deriving a plurality of projection vectors from a training set of sample target patterns and sample non-target patterns, each of said projection vectors being derived to achieve a separation between said sample target patterns and a close-to-maximal portion of selected sample non-target patterns from said training set; and a multi-stage classifying means operatively associated with said training means for determining whether said input pattern belongs to said target class by successively projecting said input pattern using a rejection-based sequence of stages of said projection vectors to ascertain whether said input pattern should be rejected as belonging in said non-target class, said classifying means being configured to label said input pattern as belonging in said non-target class at each successive stage if a predefined condition is satisfied and being configured to label said input pattern as belonging to said target class if said input pattern progresses through all of said stages without being labeled as belonging to said non-target class.

15. The system of claim 14 wherein said training means includes a means for calculating said projection vectors in an iterative manner such that a subsequent projection vector is at least partially dependent on a previously calculated projection vector with respect to said non-target patterns that needs to be considered to calculate said subsequent projection vector.

16. The system of claim 15 wherein said means for calculating said projection vectors is configured to utilize a proximity measure based on probability distributions of said sample target patterns and said sample non-target patterns in order to calculate said projection vectors.

17. The system of claim 16 wherein said means for calculating each said projection vector (u) is configured to minimize an expression $$\frac{u^T R_{xx} u}{u^T [R_{xx} + R_{yy} + (M_y - M_x)(M_y - M_x)^T] u},$$

where (a) $u^T$ is a transpose for u, (b) $M_x$ and $R_{xx}$ are a mean-variance pair of said probability distribution of said sample target patterns and (c) $M_y$ and $R_{yy}$ are a mean-variance pair of said probability distribution of said sample non-target patterns.

18. The system of claim 17 wherein said means for calculating said projection vectors is configured to regularize said mean-variance pairs, $M_x$, $R_{xx}$, $M_{yy}$ and $R_y$.

19. The system of claim 18 wherein said means for calculating said projection vectors is configured to regard a neighborhood of each pattern of said sample target patterns and said sample non-target patterns as additive noise with a known variance.

20. The system of claim 14 wherein said training means includes a means for determining corresponding pairs of threshold values for said projection vectors, each pair of said corresponding pairs of threshold values defining a target-containing interval for a particular projection vector, said target-containing interval defining said predefined condition.

21. The system of claim 20 wherein said classifying means includes:
a linear projection unit that is configured to generate projection values for said projection vectors, each of said projection values corresponding to a specific projection vector; and
a thresholding module operatively associated with said linear projection unit that is configured to determine whether each of said projection values falls outside a target-containing interval that is defined by a pair of said threshold values associated with said specific projection vector, said projection values that falls inside said target-containing interval being indicative of said input pattern belonging in said non-target class.

22. The system of claim 21 wherein said classifying means further includes a decision module operatively coupled to said thresholding module that is configured to identify said input pattern as belonging to said target class, if said input pattern has not been identified as belonging in said non-target class by said thresholding module.

23. A method of classifying an input pattern into one of two classes, a low probability target class and a high probability non-target class, comprising steps of:

(1) extracting a plurality of projection vectors using a sample set of target patterns and non-target patterns, each projection vector providing a close-to-maximal rejection of said non-target patterns for a given set of said target patterns and said non-target patterns, said extracting including;
calculating each of said projection vectors (u) to achieve a separation of said target patterns and a close-to-maximal portion of said given set of said target patterns and said non-target patterns, including utilizing a proximity measure of said projection vector based on probability distributions of said target patterns and said non-target patterns and based upon minimizing an expression $$\frac{u^T R_{xx} u}{u^T [R_{xx} + R_{yy} + (M_y - M_x)(M_y - M_x)^T] u},$$

where $u^T$ is a transpose with respect to said projection vector (u), $M_x$ and $R_{xx}$ are a mean-variance pair of said probability distribution of said target patterns and where $M_y$ and $R_{yy}$ are a mean-variance pair of said probability distribution of said non-target patterns; and
removing said non-target patterns from said given set that have projection values outside a target-containing interval for each of said projection vectors, said removal resulting in a reduced sample set that contains fewer of said non-target patterns, said reduced sample sets being used to calculate a subsequent projection vector;

(2) successively projecting said input pattern onto said projection vectors to derive a plurality of projection values, including examining each of said projection values to determine whether said input pattern belongs to said non-target class at each successive projection; and (3) identifying said input pattern as belonging in said target class if said input pattern has not been determined as belonging in said non-target class.

24. The method of claim 23 wherein said step of examining each of said projection values includes a step of thresholding each of said projection values with at least one threshold value for said determination.

25. The method of claim 24 wherein said step of thresholding each of said projection values with at least one of said threshold values is a step of thresholding each of said projection values with an upper limit threshold value and a lower limit threshold value to determine whether said input pattern belongs in said non-target class at each successive projection, a projection value that falls outside an interval defined by said upper and lower limit threshold values being determined as belonging in said non-target class.

26. The method of claim 23 further comprising a step of receiving said sample set of target patterns and non-target patterns in a vector form, wherein vectors of said target patterns represent blocks of image pixels that contain a picture of a human face and wherein vectors of said non-target patterns represent blocks of image pixels that do not contain said picture of said human face.

27. The method of claim 23 further comprising a step of regularizing said mean-variance pairs, $M_x$, $R_{xx}$, $M_y$ and $R_{yy}$.

28. The method of claim 27 wherein said step of regularizing said mean-variance pairs includes regarding a neighborhood of each pattern of said target patterns and said non-target patterns as additive noise with a known variance.

* * * * *